United States Patent Office 3,097,164
Patented July 9, 1963

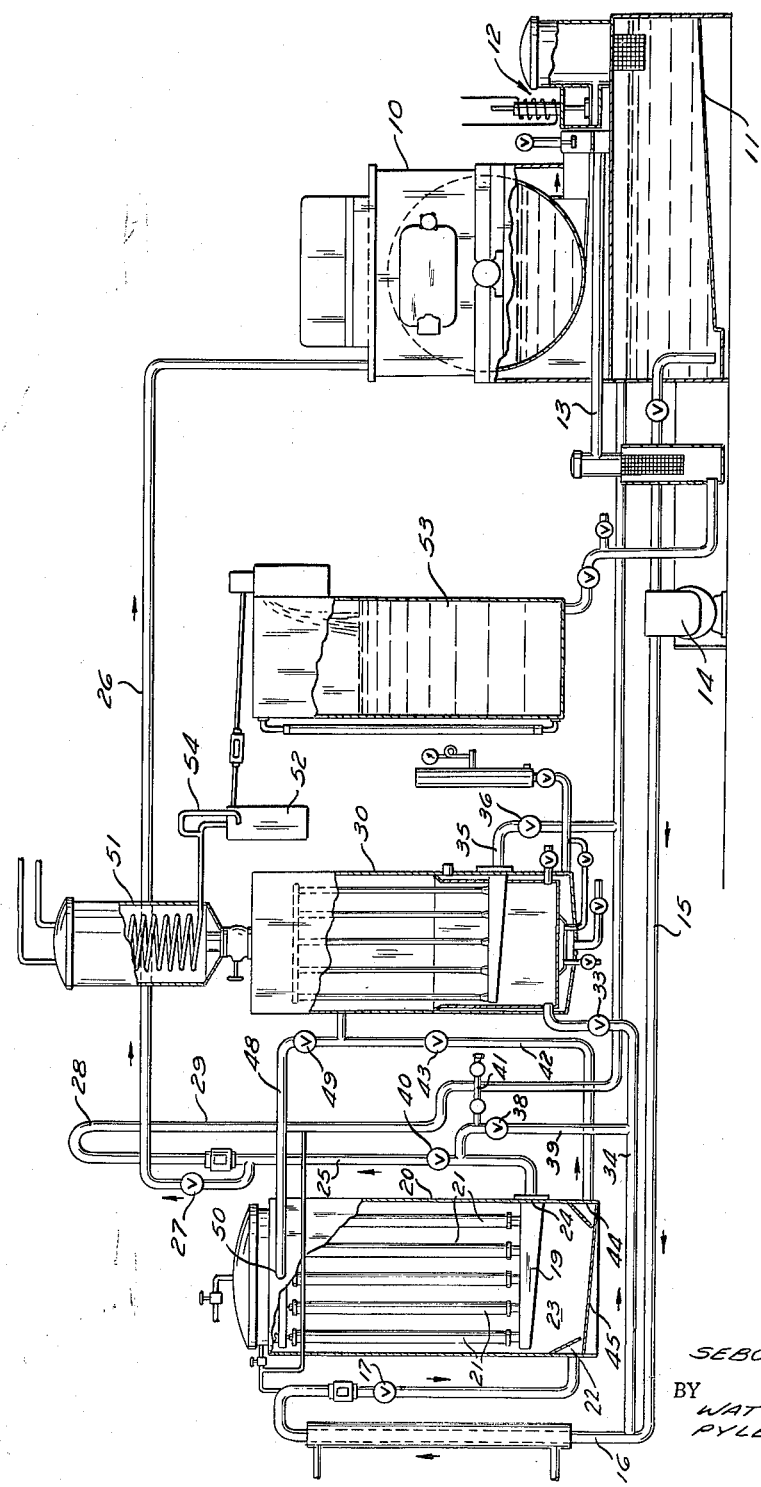

3,097,164
DRY CLEANING PROCESS
Sebough S. Shields, Cleveland Heights, Ohio, assignor to Noubar S. Abdalian and Robert V. Abdalian, Cleveland Heights, Ohio
Filed Jan. 29, 1960, Ser. No. 5,426
2 Claims. (Cl. 210—73)

The usual dry cleaning apparatus includes a filter for removing impurities from a circulated solvent. In addition to the usual connections to a cleaning chamber a pump and a supply tank, normally the solvent filter is connected to a device which is well known in the dry cleaning industry and is known as a "muck cooker." A muck cooker is a type of dry cleaning solvent purifying or reclaiming still. The muck cooker is a multi-purpose device. The purposes include removal of dissolved or suspended solid impurities including filter powder and liquid impurities from dry cleaning solvents delivered from the filter tank to the cooker.

A second purpose is to reclaim solvent from the filter powder and other impurities.

Another purpose is accomplished by occasionally pumping the solvent into the muck cooker for distillation.

In operation of the usual dry cleaning system the flow of fluid through the solvent is reversed periodically to reverse flush the solvent filters. During reverse flushing solvents are conducted in through a solvent filter tank opening which is usually the outlet, through the filters in a direction reverse to normal flow, and out an outlet passageway provided for the purpose near the bottom of the solvent filter tank. The reverse flush solvent and impurities including used filter powder are flushed into the muck cooker.

The described solvent purification techniques are satisfactory to remove any dissolved impurities and any impurities that have a tendency to settle in the solvent. Expressed another way, these usual techniques remove any impurities that are either dissolved in the solvent or heavier than the solvent.

However, prior to this invention solvent filter tanks have acted as unwanted water traps. In such filter tanks water and any other impurities which are both not miscible with the solvent and of a lower specific gravity than the solvent, rise in the interior of the solvent filter tank and collect at the top. In prior cleaning systems there has been no way to remove these light, non-miscible solvent impurities from the solvent filter tank. Needless corrosion, solvent poisoning and other deleterious effects are the inevitable result.

One of the principal objects of this invention is the selective conduction of solvent impurities that tend to rise in the solvent and are trapped in a solvent filter tank from the filter tank to a muck cooker or other still.

Another object of this invention is to provide a method of purifying dry cleaning solvents of impurities that tend to rise in the solvents.

A further object of this invention is to provide a method of removing all impurities from a dry cleaning solvent system.

Other objects and a fuller understanding of the invention may be had by referring to the following description and claims, taken in conjunction with the accompanying drawings, in which:

The sole FIGURE is a somewhat schematic view, partially sectioned, showing a dry cleaning system incorporating the present invention.

The detailed operation of a dry cleaning system is explained in United States Patent No. 2,729,961, issued January 10, 1956, and entitled "Dry Cleaning Apparatus." The present invention utilizes elements and methods of operation quite similar to the structure disclosed and taught in that patent. The features which are environmental to the present invention and shown in detail in that patent will only be described briefly here.

In the drawing, a dry cleaning compartment 10 is shown. The compartment 10 is connected to a solvent storage tank 11 by a valve and pipe system designated generally at 12. This valve and pipe system 12 selectively directs solvent discharged from the compartment 10 either into the storage tank 11 or into a bypass pipe 13. A circulating pump 14 is provided which can pump a solvent either from the storage tank 11, or from the bypass pipe 13, or both through the system.

During normal operation, the circulating pump 14 constantly pumps solvent into a delivery pipe 15. The solvent passes from a delivery pipe 15 through a solvent filter tank supply pipe 16 when a control valve 17 connected to the solvent filter tank supply pipe 16 is open. The filter tank supply pipe 16 is connected to a solvent filter tank 20 through an inlet opening 22. The inlet opening 22 is near the bottom of the solvent filter tank 20.

The solvent filter tank defines a solvent chamber 23. A plurality of lint filters 21 are carried by a manifold 19. The manifold 19 and filters 21 are disposed within the solvent chamber 23.

The manifold 19 connects the filters to a solvent filter tank outlet opening 24. The details of lint filters and manifolds similar to those shown here are more completely disclosed in copending application for patent Serial No. 83,200, filed by Noubar S. Abdalian and Robert V. Abdalian under the title "Filtering Apparatus for Dry Cleaning Solvents" on January 17, 1961.

A solvent filter tank outlet conduit 25 delivers filtered solvent from the tank 20. The filtered solvent may pass through a cleaning compartment delivery conduit 26 into the cleaning compartment 10. A valve 27 controls the flow of filtered solvent through the delivery conduit 26. When the valve 27 is closed the filtered solvent passes through a gravitational valve 28 and thence through a return conduit 29 back to the storage tank 11.

A solvent purifier in the form of a specialized filtering still 30 is provided. This specialized still 30 is known in the dry cleaning industry as a "muck cooker." The structure and operation of the preferred muck cooker are more fully described in copending application for patent Serial No. 73,608, filed December 5, 1960, under the title "Dry Cleaning Solvent Purifying Apparatus."

Periodically, all the solvent in the system may be pumped through the muck cooker for a purifying process. To accomplish this a muck cooker supply valve 33 is opened and solvent is then pumped from the storage tank 11 through the supply conduit 15 and a muck cooker supply conduit 34 into the muck cooker. The purified solvent is returned to the storage tank 11 by a muck cooker return conduit 35 which is controlled by a muck cooker return conduit valve 36. The muck cooker return conduit 35 is connected to the return conduit 29.

The muck cooker usually contains a supply of solvent filtering powder which has been used in the solvent filter to purify the solvent. The filtering powder is used in the filter tank to remove dissolved and suspended impurities from the solvent. The powder is delivered to the muck cooker by a process known as "reverse flushing."

Periodically it is desirable to clean the filters 21 and the filter tank by this reverse flushing process. This is accomplished by closing the solvent filter tank inlet control valve 17 and opening a reverse flushing inlet control valve 38. Solvent is then conducted through the muck cooker supply conduit 34 and thence through a reverse flushing conduit 39 into the manifold 19. A filtered solvent outlet control valve 40 is also closed to close the filter tank outlet conduit 25 and cause the reversely directed solvent to flow into he manifold 19 rather than the conduit 25.

When the solvent is pumped through the reverse flushing conduit 39 into the manifold 19, it passes in a reverse direction through the filters 21, flushing lint particles, filter powder encrusted on the filters and other filtered out objects off the filters 21. As air may be introduced through an air conduit 41 to assist in loosening this encrusted powder and other filtered out objects from the filters 21. A reverse flushing outlet conduit 42 is opened by opening the reverse flushing conduit control valve 43. The reverse flushing conduit 42 conducts solvent and suspended powder from a solvent filter tank flushing outlet passage at 44 into the muck cooker 30. A slanted baffle 45 helps the flowing solvent carry the filter powder, filtered lint sediment, and the like, out through the reverse flushing outlet 44 which, as will be seen by examining the drawing, is at the bottom of the solvent filter tank 20.

The solvent passes through the filters in the muck cooker and then back to the supply tank. Subsequently, steam is passed up through the sediment, or muck, in the cooker to carry solvents into a condenser chamber 51. The condenser vapors are conducted to a water separator 52. Solvent then passes from the water separator 52 to reserve tank 53 while water is discharged from tube 54.

The foregoing discussion discloses in a general way the operation of a dry cleaning system. A more detailed description of each of these elements will be found in the cross-referenced patent and patent applications. The previously described apparatus is very efficient for the purpose of removing heavy particles from a dry cleaning solvent. By heavy particles, it is meant particles which have a greater specific gravity than the solvent. The described system is also very efficient for removing fluids which are heavier than the solvent and impurities which become dissolved or dispersed through the solvent. It is evident that these heavy particles and liquids can be removed from the lint filter and conducted into the muck cooker during normal operation of the system.

Since water is lighter than many commonly used dry cleaning solvents, the described system has one material drawback. Water tends to become emulsified with the solvent and carried with it so long as the solvent is flowing at a relatively high rate. However, when the solvent comes into the relatively quiet solvent supply chamber 23, where the rate of flow will be relatively slow because of the large volume, water tends to rise to the surface of the solvent and separate from it. Further, when the system stands idle for a period of time, such as over night or over a weekend, the water will rise in the filter tank and become separated and trapped at the top. This is also true of any other impurities in the solvent which are lighter than the solvent. The water and other relatively light impurities tend to collect at the top of the solvent filter tank 20. The collection of these impurities at the top of the tank can and does lead to unnecessary and abnormal rust, corrosion and other deleterious effects. Further, if the filters are removed for filtering or repair through the top of the filter tank, they are apt to be contaminated by passing through impurities which have collected at the top of the chamber 23.

The present invention overcomes all of these and other disadvantages by providing a light contaminant outlet conduit 48 which connects the top of the chamber 23 with the muck cooker 30. The connection of the light contaminant outlet to the tank 20 is identified by the numeral 50. This connection is near the top of the tank and slightly below the normal fluid level of the tank to permit water and other light-weight contaminants to be tapped off.

The outlet contaminant conduit 48 is controlled by a valve 49. Impurities may be directed from the top of the chamber 23 to the muck cooker 30, at any time when the pump 14 is operating by opening the valve 49. One of the preferred times for opening the valve 49 is in the morning before cleaning operations are commenced, in order that the impurities which have risen during the night are tapped off. Another time when the valve 49 may be opened is when solvent is being reverse flushed through the manifold 19. At such times there will be no interference with the cleaning operation by reducing the solvent supply pressure.

Thus, another of the outstanding advantages of this system is that solvent impurities which are either lighter or heavier than the solvent can be removed from the solvent, and particularly from the solvent in the filter tank 20. This removal can be accomplished without interfering with the normal dry cleaning operations.

While the invention has been described with a great deal of detail, it is believed that it essentially comprises a dry cleaning system including a solvent filter and a purifier in which a contaminant outlet conduit is connected to the top of the solvent filter tank and to the purifier. The invention also includes a heavy contaminant outlet conduit which connects the bottom of the solvent filter to the purifier.

Although the invention has been described in its preferred form with a great deal of particularity, it is understood that the present disclosure of the preferred form has been made only by way of example, and that numerous changes in the details of construction and the combination and arrangement of parts may be resorted to without departing from the spirit and the scope of the invention as hereinafter claimed.

What is claimed is:

1. In a cleaning system for dry cleaning in which cleaning operations are normally affected by circulating cleaning fluid from a sump to a filter tank and thence to a cleaning chamber and return, the process of reconditioning contaminated fluid comprising:
    (a) periodically stopping the normal circulation of fluid for cleaning operations and allowing the system to stand idle for a period of time thereby collecting lighter contaminants in the fluid near the top of the tank and heavier contaminants in the fluid near the bottom of the tank;
    (b) periodically establishing a flow pattern from the top of the tank to a solvent reconditioning structure to draw off fluid contaminated with the collected light contaminants while the normal circulation was stopped;
    (c) periodically establishing a flow pattern from the bottom of the tank to the reconditioning structure to draw off fluid contaminated with the collected heavier contaminants while the normal circulation was stopped;
    (d) thereafter treating the contaminated fluid in the reconditioning structure to separate the cleaning fluid from contaminants and thereby recondition the fluid; and,
    (e) thereafter delivering the reconditioned fluid to the sump.

2. The process of claim 1 wherein at selected times steps (b) and (c) are effected simultaneously.

References Cited in the file of this patent
UNITED STATES PATENTS

| | | |
|---|---|---|
| 2,729,961 | Shields | Jan. 10, 1956 |
| 2,772,234 | Kelly | Nov. 27, 1956 |
| 2,893,925 | Victor | July 7, 1959 |